United States Patent [19]

Mueller

[11] 3,864,411

[45] Feb. 4, 1975

[54] SELECTIVE CHLORINATION OF OLEFINS IN FUSED SALTS

[75] Inventor: Wolfgang H. Mueller, Elizabeth, N.J.

[73] Assignee: Esso Research and Engineering Company, Linden, N.J.

[22] Filed: Jan. 27, 1967

[21] Appl. No.: 612,078

[52] U.S. Cl.............. 260/660, 260/648, 260/651, 260/654, 260/656, 260/649
[51] Int. Cl............................................. C07c 17/02
[58] Field of Search ........... 260/662, 660, 648, 651, 260/658 R, 653, 662 R, 660, 656, 651 R, 648 R, 648 C, 648 H, 649 R, 650 R, 659 A, 654 A, 654 H, DIG. 42

[56] References Cited
UNITED STATES PATENTS

| | | | |
|---|---|---|---|
| 2,034,292 | 3/1936 | Grebe et al. | 260/658 |
| 2,353,563 | 2/1940 | Hemminger | 260/660 |
| 3,210,431 | 10/1965 | Engel | 260/659 A |

FOREIGN PATENTS OR APPLICATIONS

| | | | |
|---|---|---|---|
| 1,042,558 | 11/1958 | Germany | 260/660 |
| 489,871 | 1/1953 | Canada | 260/659 A |
| 907,435 | 10/1962 | Great Britain | 260/654 A |
| 574,469 | 4/1959 | Canada | 260/662 |
| 849,434 | 9/1960 | England | 260/648 |

*Primary Examiner*—Bernard Helfin
*Assistant Examiner*—Joseph A. Boska
*Attorney, Agent, or Firm*—Jay Simon; Chasan and Sinnock, J. E. Luecke; Donald C. Caulfield

[57] ABSTRACT

Olefinic compounds are reacted with halogens in liquefied halide baths at temperatures ranging from about 100°–400°C. High yields and high selectivites to halogenated products are achieved. The products are useful in the preparation of solvents and as intermediates in the preparation of polymers, e.g., via dehydrohalogenation.

5 Claims, No Drawings

SELECTIVE CHLORINATION OF OLEFINS IN FUSED SALTS

This invention relates to a process for preparing halogenated compounds. More particularly, this invention relates to a halogenation process wherein olefinic compounds are reacted with halogens, i.e. chlorine, bromine, in a liquified halide, i.e. chlorine or bromine, bath. In a particularly preferred embodiment a continuous process in a flow reactor is contemplated.

The addition of halogens to unsaturated hydrocarbons is regarded as one of the classical reactions of carbon-carbon double bonds. Ordinarily this reaction is carried out by treating an excess of olefinic compound with a limited amount of halogen, e.g., chlorine or by reacting equimolar amounts of olefin and halogen in an inert solvent, e.g., carbon tetrachloride. Another method for halogenating olefins utilizes Friedel-Crafts type catalysts, e.g., $FeCl_3$, $SbCl_3$, $AlCl_3$ in chlorinated hydrocarbon solvents. These procedures suffer from the disadvantage of having to conduct the reactions at relatively low temperatures, i.e., room temperature or below, to avoid deleterious side reactions, e.g., formation of allylic and vinylic halides and polychlorinated compounds which lowers the yield of the chlorinated product.

Additionally, molten salt baths are known to the prior art and have been employed in chlorination reactions. For example, U.S. Pat. No. 2,140,549 describes the preparation of 1,1,2-trichloroethane by the reactions of ethylene chloride and chlorine in a bath of molten metal chlorides, e.g., potassium chloride and aluminum chloride. However, the reaction product contained only 49.5 wt. % of the desired product along with considerable amounts of unreacted feed and other chloro compounds.

It has now been discovered, however, that conversions in excess of 95% with selectivities to the halogenated product of 95+%, preferably 99+% can be achieved in accordance with the instant inventive process. The process of this invention is conducted by reacting mono-olefinic compounds with a halogen, bromine or chlorine, in a bed of liquefied salts at a temperature ranging from about 100°C. to about 400°C. It is desirable that chlorination be effected with chloride salts and bromination be effected with bromide salts. Thus, while prior art processes required rather narrow temperature ranges, the present process can be conducted over a rather wide temperature range, thereby facilitating the reaction process and eliminating careful monitoring of temperatures.

Suitable feedstocks for use in the present invention are mono-olefinic, i.e., nonaromatic carbon-carbon double bond, compounds, either gaseous or liquid, as follows:

A. $C_2 - C_{20}$ branched and straight chain mono-olefins including those containing other functional groups such as aryl groups and oxygenated functions, e.g. carboxyl groups, carbonyl groups, etc. Such compounds are preferably defined by the generic formula:

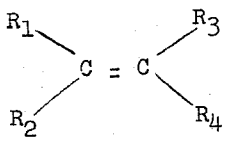

wherein $R_1$, $R_2$, $R_3$ and $R_4$ are each selected from the group consisting of hydrogen, $C_1 - C_{14}$ alkyl, and $C_6 - C_{10}$ aryl, preferably $C_1$ to $C_6$ alkyl and $C_6$ aryl, more preferably $C_1$ to $C_4$ alkyl radicals. Particularly preferred feedstocks are the straight chain olefinic hydrocarbons having from 2 to about 16 carbon atoms per molecule, still more preferably 2 - 8 carbon atoms per molecule. Typical examples of the feedstocks are: ethylene, propylene, butene-1, butene-2, 2-methylbutene-1, pentenes, hexenes, etc., styrene and the like.

B. $C_3$ to $C_{18}$, preferably $C_3$ to $C_{12}$ cyclic mono-olefins and substituted mono-olefins, including as substituents aryl groups, carboxyl groups, carbonyl groups and the like, e.g. cyclopropene, cyclobutene, cyclopentene, and that homologous series, cyclopentenoic acids, cyclohexanoic acid and their esters, etc.

The halide salt baths that may be utilized in this invention as polar reaction media are those that are liquid at reaction conditions. Such baths may be liquid at room temperature or liquefied by heating to reaction temperatures, i.e., molten at reaction temperatures. These salt baths are generally comprised of a heavy metal halide, e.g., ferric chloride, antimony trichloride, zirconium tetrachloride, stannic chloride, titanium tetrachloride, tellurium chloride, aluminum chloride, bismuth trichloride, zinc chloride, etc., their corresponding bromide salts, in conjunction with one or more of the alkali metal halides, i.e. lithium, sodium, potassium, rubidium, cesium, and/or ammonium halide. However, in order to achieve the excellent selectivity and yield inherent in this process it is necessary that the heavy metal halides which are also useful as relatively strong Friedel-Crafts catalysts not be present in the free state, i.e., they must be employed with not less than a total of one molar equivalent of one or more of the alkali metal halides and/or ammonium halide or mixtures thereof. The use of "mixtures thereof" contemplates mixtures of alkali metal halides as well as mixtures of one or more alkali metal halides with ammonium halide. In this manner, detrimental side reactions, involving the olefin, due to the presence of a Friedel-Crafts catalyst are eliminated. Nevertheless, when the heavy metal halide is known to be only a weak Friedel-Crafts reagent, e.g. Fe, Sn(II), Bi, Zn, an excess over one molar equivalent of the heavy metal halide may be tolerated. It is preferred, however, regardless of the heavy metal halide employed, to utilize not less than a total of one molar equivalent of the alkali metal and/or ammonium halides. If more than one molar equivalent is employed, the excess is not of essential importance so long as the bath is of sufficient fluidity to maintain the reaction. Preferred reaction media are comrised of aluminum halide and not less than a total of one molar equivalent, based on $AlCl_3$, of at least one halide selected from the group consisting of an alkali metal halide, ammonium halide, and mixtures thereof. Among the alkali metals, Li, Na and -K, particularly Na and -K are preferred. Also the liquefied baths are preferably anhydrous. The process is particularly useful in chlorinating olefins, and therefore, chloride baths will be utilized.

By virtue of utilizing the liquefied salt bath the reaction conditions under which this process may be operated are not at all critical. Reaction temperatures may vary over a considerable range and should be such as to impart sufficient fluidity to the salt bath. Normally, reaction temperatures may range from about 100°C. to about 400°C. and preferably from 150°C. to 200°C.

While the process may be carried out in either the liquid or vapor phase, depending upon the olefin to be reacted and the reaction temperature, a salt bath forming a eutectic should have its melting point below the reaction temperature; thus, temperatures below about 100°C. frequently lead to solidification, insufficient fluidity of such salt baths, or poor reaction rates. On the other hand, temperatures above about 400°C. lead to extensive decomposition of the product and deviations from the desired reaction mechanism. Similarly, pressures are not critical and may vary from 1 to 100 atmospheres, preferably 1 – 10 atmospheres, e.g., 1 atmosphere. In case of high boiling products the reaction may be carried out below atmospheric pressure, e.g. 0.1 atm. to assure fast removal of the halogenated product. The reaction is normally carried out for a period of time sufficient to enable substantially complete conversion of the halogen reactant. Normally, however, reaction times, i.e., contact time of the reactants with the melt, may range from about 0.01 to 10 seconds, preferably 0.1 to 0.5 seconds. The molar ratio of olefin to halogen is generally about 10/1 to 1/1, however, higher or lower mole ratios may also be used. Preferably the molar ratio is about 1.3/1 to 1/1. Reaction vessels need only be of materials which are inert to the action of fused salt baths and are illustrated by Pyrex glass (heat resistant glass).

In an embodiment of this invention, it is possible, by employing a bromine reactant with a chloride salt bath or a chlorine reactant with a bromide salt bath, to prepare vicinal dihalides containing dissimilar halogens, e.g. chlorobromo ethane, 1-chloro-2-bromo-cyclohexane. Such compounds find usefulness where it is desired to replace one of the halogens with additional substituents, e.g. bromine will be replaced more easily than chlorine.

In a typical embodiment of this invention ethylene and chlorine are introduced to a melt at about 150°C. and atmospheric pressure in mole ratios within the above-defined ranges. The melt is prepared from 35 mole % sodium chloride, 15 mole % potassium chloride and 50 mole % aluminum chloride. In this particular instance it is important that the melt not contain any free aluminum chloride in order to avoid the possibility of wasteful side reactions involving the olefin. Nitrogen or other inert gases, e.g. argon, helium, etc. can be admixed with the reactant gases as a carrier gas for facilitating the removal of the products from the reaction chamber. (When employing a carrier gas, about 1 – 20 moles of carrier gas per mole of feed may be employed.) In the case of a liquid olefin, nitrogen or other inert gases can be used as a carrier for introducing the olefins into the melt. Excess olefin or nitrogen is used as a carrier gas to remove the products from the melt and the reactor vessel. One or several cold traps are used to collect the products. In case of low boiling olefins, the temperature of the cold traps is kept above the boiling point of the olefin or carrier gas, however, considerably below the boiling point of the product. This achieves simple separation of the product from unreacted olefin. High boiling olefins are separated from their corresponding chlorinated products by appropriate distillation methods.

In a particularly preferred embodiment, the low vapor pressure of liquefied salt baths and relatively high reaction temperatures employed, allow for the continuous chlorination of olefins in a flow reactor. The reaction conditions described above are applicable for continuous type processes.

Having now described the invention, a more complete understanding of the process will be had by reference to the following illustrative examples. However, since variations and modifications will be obvious to those skilled in the art, no limitations are to be implied from the data shown herein.

EXAMPLE 1 - Chlorination of Ethylene

Ethylene and chlorine, from separate inlet tubes, are introduced, along with a nitrogen carrier gas, to a cylindrical 250 ml Pyrex glass reaction chamber containing ca. 200 gm of a NaCl, KCl and $AlCl_3$ melt as solvent. The melt was prepared from from 15 mole % KCl, 35 mole % NaCl, and 50 mole % $AlCl_3$. No free $AlCl_3$ was present. The products were swept out by the nitrogen carrier gas, collected in cold traps and analyzed by gas liquid chromatography (g.l.c.) and combined g.l.c.-time of flight-mass spectrometry. Reaction conditions, conversions and product distributions are shown in Table I.

TABLE I

CHLORINATION OF ETHYLENE IN A NaCl, KCl and $AlCl_3$ MELT

| $CH_2=CH_2/Cl_2$ Mole Ratio | Temp. °C. | Conversion[b] % | Products (Selectivity %)[a] | | |
|---|---|---|---|---|---|
| | | | $ClCH_2CH_2Cl$ | $CH_3CH_2Cl$ | $CH_2=CHCl$ |
| 4.3 | 150 | >95 | 98.6 | 1.4 | 0 |
| 2.5 | 150 | do. | 99.6 | 0.7 | 0 |
| 1.3 | 170 | do. | 99.5 | 0.4 | 0.1 |
| 1.6 | 210 | do. | 96.8 | 2.6 | 0.6 |
| 1.3 | 370 | >90 | 70 | 5 | 15[c] |

[a] 2 – 3% of carbonaceous solid was isolated from the melt.
[b] Conversion to volatile products.
[c] In addition several minor products (ca. 10% of total volatiles): 2 – 4% $CH_2=CCl_2$; 1.8% $ClCH=CHCl$ (trans); 3.7% $ClCH=CHCl$ (cis); 1.1% $CH_3CHCl_2$; 1.52% $ClCH_2CHCl_2$ and traces of isobutane; isopentene; butadiene; chloroprene; $(CH_3)CCl$.

This table clearly shows the excellent conversions obtainable with this reaction system and selectivities of 95+% and 99+% at preferred operating conditions.

EXAMPLE 2 - Chlorination of Propylene

The same eutectic and procedures as described in Example 1 was used for this reaction. The results are summarized in Table II.

TABLE II
Chlorination of propylene in a NaCl, KCl and AlCl₃ melt

| Mole ratio, $C_3H_6/Cl_2$ | Temp., °C. | Conversion, percent [a] | Volatile products (selectivity percent) | | |
|---|---|---|---|---|---|
| | | | $ClCH_2CHCH_3$ (Cl) | $CH_2=CHCH_2Cl$ | By-products [b] |
| 4.1 | 160 | >86 | 88.5 | 1.2 | 10.3 |
| 1.3 | 165 | >86 | 92 | 1 | 7 |
| 1.2 | 305 | 40 | 69 | 7.9 | 23.1 |
| 1.4 | 150 | >95 | 95 | 0.6 | 4.4 |
| 1.3 | 140 | >98 | 99 | 0.5 | 0.5 |

[a] Conversion to volatile products; the rest is a nonvolatile carbonaceous solid which was isolated from the melt.
[b] By-products: $ClCH=CHCH_3$ (cis and trans); $(CH_3)_3CHCl$, $CH_3CH_2CHCl_2$;

$ClCH_2\overset{Cl}{C}HCH_2Cl$;

$Cl_2CHCHClCH_3$; and $C_3$, $C_5$, $C_6$, $C_7$ saturated hydrocarbons.

EXAMPLE 3 - Chlorination of Butene-1

In equipment similar to that used in Example 1 but with a melt of $NH_4Cl$ and $ZnCl_2$ (48.2 mole % $ZnCl_2$), butene-1 was chlorinated at 220°C. with a butene/chlorine mole ratio of 1.4/1. A quantitative conversion to volatile products (based on chlorine) was obtained. G.L.C. analysis revealed the following product distribution: 1,2-dichlorobutane - 92.5%; chlorobutenes (6- isomers) - 5.5%; dichlorobutene - 2%. The chlorobutenes are believed to result from dehydrohalogenation in the melt. This dehydrohalogenation in the melt can be minimized at lower reaction temperatures and/or shorter contact time. The foregoing examples illustrate the exceptionally high yields of halogenated saturates that may be achieved by the process described herein.

What is claimed is:

1. A halogenation process which comprises reacting a mono-olefinic hydrocarbon selected from the group consisting of (a) $C_2$–$C_{20}$ compounds of the general formula:

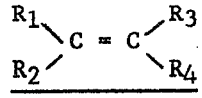

wherein $R_1$, $R_2$, $R_3$ and $R_4$ are each selected from the group consisting of hydrogen, $C_1$–$C_{14}$ alkyl and $C_6$–$C_{10}$ aryl radicals, and (b) $C_3$–$C_{18}$ cyclic hydrocarbons with a halogen selected from the group consisting of chlorine and bromine, the reaction being conducted in a liquefied halide salt melt bath at temperatures ranging from about 100° to 400°C., wherein the liquefied halide salt melt bath is comprised of an aluminum halide and not less than a total of one molar equivalent, based on aluminum halide, of at least one halide selected from the group consisting of alkali metal halides, ammonium halides, and mixtures thereof.

2. The process of claim 1 wherein the liquefied halide salt melt bath is comprised of aluminum chloride, and not less than a total of one molar equivalent, based on aluminum chloride, of potassium chloride and sodium chloride.

3. The process of claim 1 wherein said mono-olefinic hydrocarbon is selected from the group consisting of ethylene, propylene and butene-1.

4. A halogenation process which comprises reacting a mono-olefinic hydrocarbon selected from the group consisting of (a) $C_2$–$C_{20}$ compounds of the general formula:

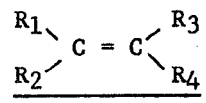

wherein $R_1$, $R_2$, $R_3$ and $R_4$ are each selected from the group consisting of hydrogen, $C_1$–$C_{14}$ alkyl and $C_6$–$C_{10}$ aryl radicals, and (b) $C_3$–$C_{18}$ cyclic hydrocarbons with a halogen selected from the group consisting of chlorine and bromine, the reaction being conducted in a liquefied halide salt melt bath at temperatures ranging from about 100° to 400°C., wherein the liquefied halide salt bath is comprised of zinc chloride and not less than a total of one molar equivalent, based on zinc halide, of ammonium chloride.

5. The process of claim 4 wherein said mono-olefinic hydrocarbon is selected from the group consisting of ethylene, propylene and butene-1.

* * * * *